United States Patent
Myers

(10) Patent No.: US 7,638,892 B2
(45) Date of Patent: Dec. 29, 2009

(54) GENERATING ENERGY FROM FLUID EXPANSION

(75) Inventor: Scott R. Myers, La Mirada, CA (US)

(73) Assignee: Calnetix, Inc., Cerritos, CA (US)

( * ) Notice: Subject to any disclaimer, the term of this patent is extended or adjusted under 35 U.S.C. 154(b) by 171 days.

(21) Appl. No.: 11/735,839

(22) Filed: Apr. 16, 2007

(65) Prior Publication Data
US 2008/0252077 A1    Oct. 16, 2008

(51) Int. Cl.
F01D 15/10 (2006.01)
F02C 6/00 (2006.01)
H02K 7/18 (2006.01)

(52) U.S. Cl. ..................................... 290/52
(58) Field of Classification Search .............. 290/52
See application file for complete search history.

(56) References Cited

U.S. PATENT DOCUMENTS

| | | | | |
|---|---|---|---|---|
| 2,276,695 A | * | 3/1942 | Lavarello | 415/65 |
| 2,409,857 A | | 10/1946 | Hines et al. | 310/15 |
| 2,465,761 A | | 3/1949 | Staude | 60/392 |
| 2,917,636 A | | 12/1959 | Akeley | 290/52 |
| 3,060,335 A | | 10/1962 | Greenwald | 310/54 |
| 3,064,942 A | | 11/1962 | Martin | 415/32 |
| 3,439,201 A | | 4/1969 | Levy et al. | 310/52 |
| 3,943,443 A | | 3/1976 | Kimura et al. | 324/163 |
| 4,170,435 A | | 10/1979 | Swearingen | 415/1 |
| 4,260,914 A | | 4/1981 | Hertrich | 310/27 |
| 4,341,151 A | | 7/1982 | Sakamoto | 454/209 |
| 4,358,697 A | | 11/1982 | Liu et al. | 310/156.84 |
| 4,362,020 A | * | 12/1982 | Meacher et al. | 60/657 |
| 4,415,024 A | | 11/1983 | Baker | 165/160 |
| 4,544,855 A | | 10/1985 | Prenner et al. | 310/59 |
| 4,635,712 A | | 1/1987 | Baker et al. | 165/82 |
| 4,659,969 A | | 4/1987 | Stupak | 318/128 |
| 4,740,711 A | | 4/1988 | Sato et al. | 290/52 |

(Continued)

FOREIGN PATENT DOCUMENTS

| | | |
|---|---|---|
| DE | 102006004836 A1 * | 5/2007 |
| EP | 1905948 | 4/2008 |
| GB | 2225813 | 6/1990 |
| JP | 63129839 | 6/1988 |
| JP | 63277443 | 11/1988 |
| JP | 2001078390 | 3/2001 |
| WO | WO 03/100946 A1 | 12/2003 |

OTHER PUBLICATIONS

PureCycle: Overview, "Super-efficient, reliable, clean energy-saving alternatives—the future is here," (1 page) available at http://www.utcpower.com/fs/com/bin/fs_com_Page/0,5433,03400,00.html, printed Jul. 26, 2006.

(Continued)

Primary Examiner—Nicholas Ponomarenko
Assistant Examiner—Pedro J Cuevas
(74) Attorney, Agent, or Firm—Fish & Richardson P.C.

(57) ABSTRACT

Some embodiments of a fluid expansion system include a turbine generator apparatus in which the driven member is arranged on the outlet side of the turbine wheel. In such circumstances, the fluid output from the turbine wheel can flow towards the driven member, for example, to provide heat dissipation to some components of the turbine generator apparatus (e.g., generator electronics or the like). This arrangement of the turbine wheel relative to the driven member also permits the use of bearing supports on both the input side and the outlet side of the turbine wheel.

21 Claims, 4 Drawing Sheets

U.S. PATENT DOCUMENTS

| | | | |
|---|---|---|---|
| 5,003,211 A | 3/1991 | Groom | 310/90.5 |
| 5,083,040 A * | 1/1992 | Whitford et al. | 290/52 |
| D325,080 S | 3/1992 | Wortham | D23/382 |
| 5,241,425 A | 8/1993 | Sakamoto et al. | 359/824 |
| 5,315,197 A | 5/1994 | Meeks et al. | 310/90.5 |
| 5,481,145 A | 1/1996 | Canders et al. | 310/90.5 |
| 5,514,924 A | 5/1996 | McMullen et al. | 310/90.5 |
| 5,559,379 A | 9/1996 | Voss | 310/63 |
| 5,627,420 A | 5/1997 | Rinker et al. | 310/87 |
| 5,640,064 A | 6/1997 | Boyd, Jr. et al. | 310/211 |
| 5,668,429 A | 9/1997 | Boyd, Jr. et al. | 310/216.071 |
| 5,672,047 A | 9/1997 | Birkholz | 415/160 |
| 5,852,338 A | 12/1998 | Boyd, Jr. et al. | 310/89 |
| 5,894,182 A | 4/1999 | Saban et al. | 310/216.048 |
| 5,911,453 A | 6/1999 | Boyd, Jr. et al. | 29/596 |
| 5,942,829 A | 8/1999 | Huynh | 310/178 |
| 5,990,588 A | 11/1999 | Kliman et al. | 310/86 |
| 5,994,804 A | 11/1999 | Grennan et al. | 310/60 R |
| 6,002,191 A | 12/1999 | Saban | 310/216.048 |
| 6,018,207 A | 1/2000 | Saban et al. | 310/216.048 |
| 6,087,744 A | 7/2000 | Giauning | 310/58 |
| 6,088,905 A | 7/2000 | Boyd, Jr. et al. | 29/598 |
| 6,130,494 A | 10/2000 | Schöb | 310/90.5 |
| 6,148,967 A | 11/2000 | Huynh | 188/164 |
| 6,167,703 B1 * | 1/2001 | Rumez et al. | 60/599 |
| 6,191,511 B1 | 2/2001 | Zysset | 310/60 A |
| 6,223,417 B1 | 5/2001 | Saban et al. | 29/598 |
| 6,270,309 B1 | 8/2001 | Ghetzler et al. | 415/35 |
| 6,304,015 B1 | 10/2001 | Filatov et al. | 310/90.5 |
| 6,324,494 B1 | 11/2001 | Saban | 703/13 |
| 6,325,142 B1 | 12/2001 | Bosley et al. | 166/53 |
| 6,388,356 B1 | 5/2002 | Saban | 310/184 |
| D459,796 S | 7/2002 | Moreno | D23/382 |
| 6,437,468 B2 | 8/2002 | Stahl et al. | 310/61 |
| 6,465,924 B1 | 10/2002 | Maejima | 310/90.5 |
| 6,504,337 B1 | 1/2003 | Saban et al. | 318/727 |
| 6,663,347 B2 | 12/2003 | Decker et al. | 416/185 |
| 6,664,680 B1 | 12/2003 | Gabrys | 310/74 |
| 6,700,258 B2 | 3/2004 | McMullen et al. | 310/90.5 |
| 6,727,617 B2 | 4/2004 | McMullen et al. | 310/90.5 |
| 6,777,847 B1 | 8/2004 | Saban et al. | 310/211 |
| 6,794,780 B2 | 9/2004 | Silber et al. | 310/90.5 |
| 6,856,062 B2 | 2/2005 | Heiberger et al. | 310/178 |
| 6,876,194 B2 | 4/2005 | Lin et al. | 324/163 |
| 6,897,587 B1 | 5/2005 | McMullen et al. | 310/90.5 |
| 6,934,666 B2 | 8/2005 | Saban et al. | 703/2 |
| 6,967,461 B1 | 11/2005 | Markunas et al. | 318/700 |
| 7,042,118 B2 | 5/2006 | McMullen et al. | 310/12.24 |
| 7,075,399 B2 | 7/2006 | Saban et al. | 336/60 |
| 7,208,854 B1 | 4/2007 | Saban et al. | 310/61 |
| 2003/0074165 A1 | 4/2003 | Saban et al. | 703/2 |
| 2004/0027011 A1 | 2/2004 | Bostwick et al. | 310/58 |
| 2004/0189429 A1 | 9/2004 | Saban et al. | 336/57 |
| 2005/0093391 A1 | 5/2005 | McMullen et al. | 310/156.55 |
| 2007/0018516 A1 | 1/2007 | Pal et al. | 310/61 |
| 2007/0056285 A1 | 3/2007 | Brewington | 60/641.2 |
| 2007/0063594 A1 | 3/2007 | Huynh | 310/59 |
| 2007/0200438 A1 | 8/2007 | Kaminski et al. | 310/54 |
| 2008/0103632 A1 | 5/2008 | Saban et al. | 700/286 |
| 2008/0224551 A1 | 9/2008 | Saban et al. | 310/54 |
| 2008/0246373 A1 | 10/2008 | Filatov | 310/68 B |
| 2008/0252077 A1 | 10/2008 | Myers | 290/52 |
| 2009/0004032 A1 * | 1/2009 | Kaupert | 417/365 |

OTHER PUBLICATIONS

Ormat Web Site: "Recovered Energy Generation in the Cement Industry," (2 pages) available at http://www.ormat.com/technology_cement_2.htm, printed Jul. 26, 2006.

Turboden—Organic Rankine Cycle, "Turboden High Efficiency Rankine for Renewable Energy and Heat Recovery," (2 pages), available at http://www.turboden.it/orc.asp, 1999-2003. printed Jul. 27, 2006.

Turboden—Applications, "Turboden High Efficiency Rankine for Renewable Energy and Heat Recovery," (1 page), available at http://www.turboden.it/applications_detail_asp?titolo=Heat+recovery, 1999-2003, printed Jul. 27, 2006.

Freepower ORC Electricity Company Home Page, "Welcome to Freepower," (1 page) available at http://www.freepower.co.uk/, Jul. 18, 2006.

Freepower ORC Electricity Company with Landfill Flarestacks, Flarestacks (Landfill & Petrochemical), (1 page) available at http://www.freepower.co.uk/site-2.htm, 2000-2006, printed Jul. 26, 2006.

Freepower ORC Electricity Company with Industrial Processes, "Industrial Processes," (1 page), available at http://www.freepower.co.uk/site-5.htm, 2000-2006, printed Jul. 26, 2006.

Freepower ORC Electricity Company FP6 Poduct Description, "FP6," (1 page), available at http://www.freepower.co.uk/fp6.htm, 2000-2006, printed Jul. 26, 2006.

Freepower ORC Electricity Company FP120 Product Description, "FP120," (1 page), available at http://www.freepower.co.uk/fp120.htm, 2000-2006, printed Jul. 26, 2006.

Freepower ORC Electricity Company FP60 Product Description, "FP60," (1 page), available at http://www.freepower.co.uk/fp60.htm, 2000-2006, printed Jul. 26, 2006.

Freepower ORC Electricity Company Products Overview "A System Overview," (1 page), available at http://www.freepower.co.uk/tech-overview.htm, 2000-2006, printed Jul. 26, 2006.

Freepower FP6,. "Freepower FP6 Specification & Dimensions for 6kWe Electricity Generating Equipment," (2 pages), 2000-2004, printed Jul. 26, 2006.

Honeywell, "Genetron® 245fa Applications Development Guide," (15 pages), 2000.

International Search Report and Written Opinion of the International Searching Authority issued in corresponding International Application No. PCT/US2008/060227 on Oct. 28, 2008; 12 pages.

U.S. Appl. No. 12/358,172, Jan. 22, 2009, Filatov.

U.S. Appl. No. 12/267,517, Nov. 7, 2008, Filatov.

International Search Report and Written Opinion of the International Searching Authority issued in International Application No. PCT/US2008/057082 on Jul. 8, 2008, 12 pages.

International Preliminary Report on Patentability issued in International Application No. PCT/US2008/057082 on Mar. 16, 2009; 11 pages.

International Preliminary Report on Patentability issued in International Application No. PCT/US2008/060227; Jun. 17, 2009; 11 pages.

United States Patent Office's prosecution file for U.S. Appl. No. 11/524,690, 192 pages.

United States Patent Office's prosecution file for U.S. Appl. No. 12/049,117, 148 pages.

Hawkins, Lawrence A. et al., "Application of Permanent Magnet Bias Magnetic Bearings to an Energy Storage Flywheel," Fifth Symposium on Magnetic Suspension Technology, Santa Barbara, CA, Dec. 1-3, 1999, pp. 1-15.

Hawkins, Lawrence A. et al., *"Analysis and Testing of a Magnetic Bearing Energy Storage Flywheel with Gain-Scheduled, Mimo Control,"* Proceedings of ASME Turboexpo 2000, Munich, Germany, May 8-11, 2000, pp. 1-8.

McMullen, Patrick T. et al., *"Combination Radial-Axial Magnetic Bearing,"* Seventh International Symposium on Magnetic Bearings, ETH Zurich, Aug. 23-25, 2000, pp. 473-478.

Hawkins, Lawrence et al., *"Shock and Vibration Testing of an AMB Supported Energy Storage Flywheel,"* 8th International Symposium on Magnetic Bearings, Mito, Japan, Aug. 26-28, 2002, 6 pages.

McMullen, Patrick T. et al., "*Design and Development of a 100 KW Energy Storage Flywheel for UPS and Power Condition Applicatins,*" 24th International PCIM Conference, Nuremberg, Germany, May 20-22, 2003, 6 pages.

Hawkins, Larry et al., "*Development of an AMB Energy Storage Flywheel for Industrial Applications,*" 7th International Symposium on Magnetic Suspension Technology, Fukuoka, Japan, Oct. 2003, 7 pages.

Hawkins, Larry et al., "*Development of an AMB Energy Storage Flywheel for Commercial Application,*" International Symposium on Magnetic Suspension Technology, Dresden, Germany, Sep. 2005, 5 pages.

Huyng, Co et al., "*Flywheel Energy Storage System for Naval Applications,*" GT 2006-90270, Proceedings of GT 2006 ASME Turbo Expo 2006: Power for Land, Sea & Air, Barcelona, Spain, May 8-11, 2006, pp. 1-9.

McMullen, Patrick et al., "*Flywheel Energy Storage System with AMB's and Hybrid Backup Bearings,*" Tenth International Symposium on Magnetic Bearings, Martigny, Switzerland, Aug. 21-23, 2006, 6 pages.

\* cited by examiner

US 7,638,892 B2

GENERATING ENERGY FROM FLUID EXPANSION

TECHNICAL FIELD

This document relates to the operation of a fluid expansion system, including some systems that comprise a turbine apparatus to generate kinetic energy from gaseous fluid expansion.

BACKGROUND

Turbine systems can be used to generate kinetic energy in the form of a rotating driven member. In some circumstances, the rotating driven member can be used to generate electricity, for example, by rotation of a permanent magnet within a stator. Such turbine generator systems can include a turbine wheel that rotates when the compressed gas flows toward an input side of a turbine wheel and exits to an outlet side of the turbine wheel. The compressed gas can be expanded during the flow over the turbine wheel, thereby causing the turbine wheel to rotate. As the gas expands, the temperature falls, and the gas exiting the turbine wheel is thus at a lower temperature.

SUMMARY

Some embodiments of a fluid expansion system may include a turbine generator apparatus in which at least one of the rotor or the stator are cooled by flow from the outlet of the turbine wheel. In some embodiments, the rotor is arranged on the outlet side of the turbine wheel, and the expanded fluid can flow generally towards the rotor and/or stator, for example, to provide heat dissipation to some components of the turbine generator apparatus (e.g., generator electronics or the like). This arrangement of the turbine wheel relative to the driven member also permits the use of bearing supports on both the input side and the outlet side of the turbine wheel. Thus, in some embodiments, the turbine wheel can be mounted in a non-cantilevered arrangement.

In some embodiments, an apparatus may include a turbine wheel rotatable in response to expansion of a working fluid flowing from proximate an inlet side to an outlet side of the turbine wheel. The apparatus may also include a generator having a stator and a rotor, the rotor coupled to the turbine wheel so as to rotate when the turbine wheel rotates. The apparatus may further include a conduit to direct the working fluid exiting to the outlet side of the turbine wheel to cool at least one of the rotor or the stator.

In particular embodiments, a turbine generator apparatus may include a turbine wheel that is rotatable in response to expansion of a working fluid that fluid exits to an outlet side of the turbine wheel. The turbine generator apparatus may also include a permanent magnet device coupled to the turbine wheel so as to rotate when the turbine wheel rotates. The permanent magnet device may be arranged on the outlet side of the turbine wheel. The turbine generator apparatus may further include an electric generator device in which the permanent magnet is rotatable. The electric generator device may create heat when the permanent magnet rotates. At least a portion of the working fluid that exits to the outlet side of the turbine wheel can be directed toward the electric generator device to dissipate heat from the electric generator device. The turbine generator apparatus may also include first and second bearing supports coupled to the turbine wheel. The first bearing support may be arranged on the outlet side of the turbine wheel, and the second bearing support may be arranged on an input side of the turbine wheel opposite the outlet side. The turbine wheel may be supported in a non-cantilever manner between the first and second bearing supports.

In some embodiments, a method may include rotating a rotor of a generator using a turbine wheel. The method may also include cooling at least one of the rotor or a stator of the generator with a flow of fluid exiting the turbine wheel.

These and other embodiments described herein may provided one or more of the following advantages. First, some embodiments of the turbine generator apparatus may be arranged so that the fluid outflow to the outlet side of the turbine wheel is directed generally toward the rotor, the stator, or both (e.g., toward a permanent magnet, toward generator components disposed around the permanent magnet, or both). Such a configuration permits the fluid to provide heat dissipation to some components of an electrical generator device.

Second, some embodiments of the turbine generator apparatus may include a turbine wheel that is coupled to bearing supports on both the input side and the outlet side of the turbine wheel, which provides a configuration favorable to rotordynamics operation and lubrication. For example, one bearing support may be located adjacent to the input face of the turbine wheel, and a second bearing support may be located on the outlet side but axially spaced apart from the wheel outlet (e.g., not immediately adjacent to the turbine wheel outlet). Accordingly, the turbine wheel can be supported in a non-cantilevered manner with bearing supports on both the input side and the outlet side of the turbine wheel. Also, the turbine generator apparatus may be configured to provide service access to the bearing supports without necessarily removing the turbine wheel or the rotor from the turbine generator casing.

Third, some embodiments of the turbine apparatus may include at least two seals on opposing sides of the turbine wheel (e.g., at least one seal on the input side and at least one seal on the outlet side). These seals may be part of subsystem that provides a thrust balance effect to the turbine wheel during operation. In such circumstances, the thrust balance provided by the subsystem can permit significant pressure ratio implementations across the turbine wheel.

Fourth, some embodiments of the turbine generator apparatus can reduce the likelihood of leakage to or from the external environment. For example, if a portion of the working fluid diverges from the flow path and seeps past the seal around the turbine wheel, the leaked fluid may merely reenter the fluid flow path (rather than leaking outside of the fluid flow path and into the environment).

Fifth, some embodiments of the turbine generator apparatus can be used in a Rankine Cycle, such as an organic Rankine Cycle, to generate kinetic energy from fluid expansion. Such kinetic energy can be used, for example, to generate electrical power. Other embodiments of the turbine generator apparatus may be configured for use in other fluid expansion operations, for example, a Carnot cycle, a gas letdown system, a cryogenic expander system, or a process expansion system.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION OF ILLUSTRATIVE EMBODIMENTS

Figure 1:
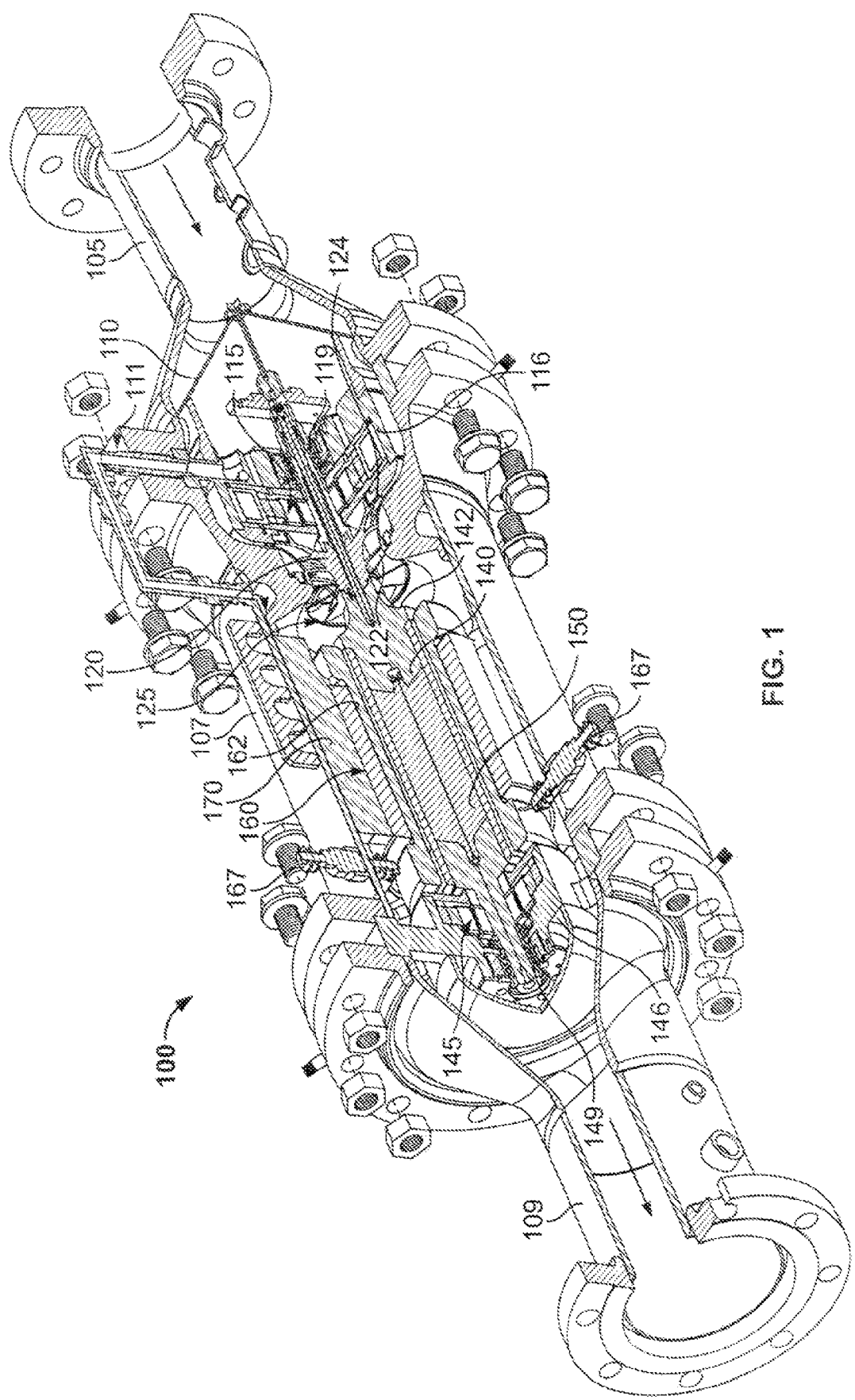
FIG. 1 is a quarter-sectional perspective view of a turbine generator system in accordance with some embodiments.
Figure 2:
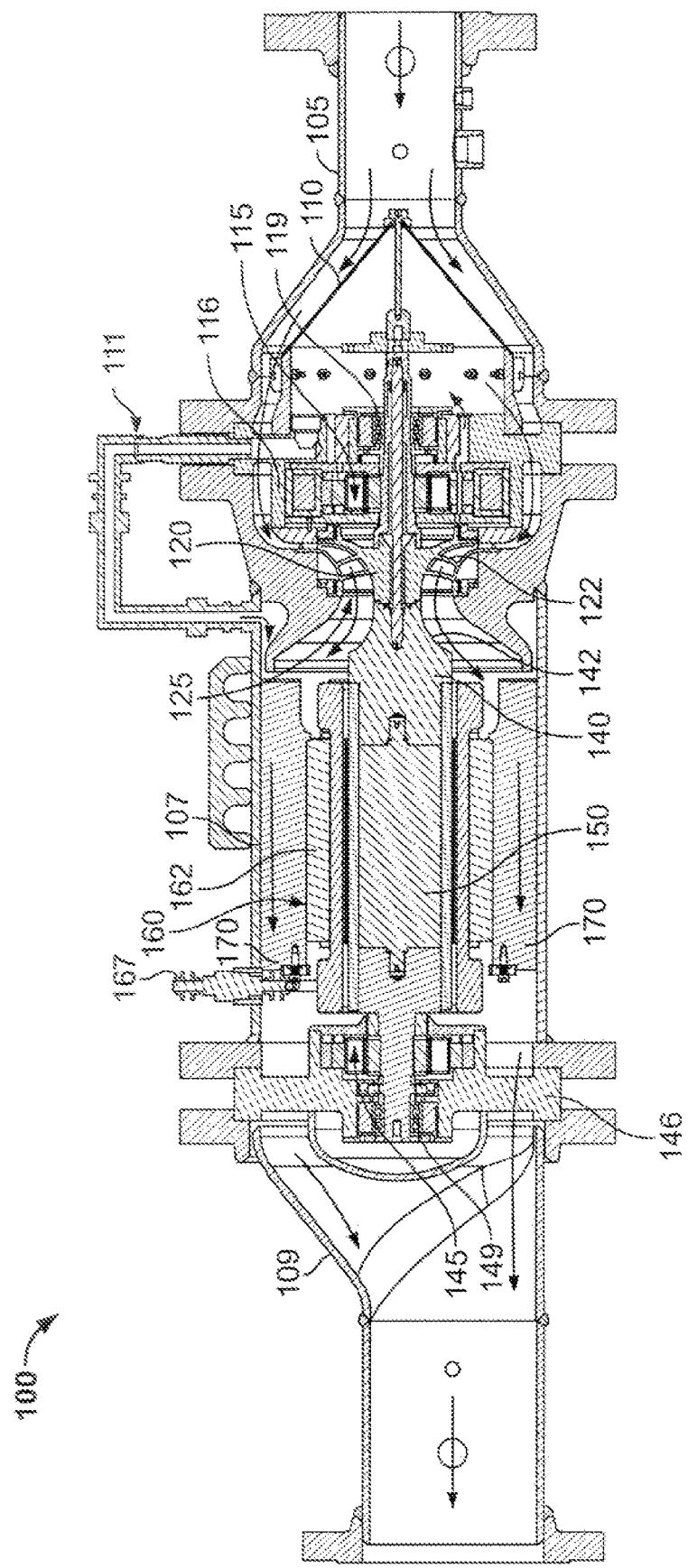
FIG. 2 is a cross-sectional view of the turbine generator system of FIG. 1.

Referring to FIGS. 1-2, a fluid expansion system may comprise a turbine generator apparatus 100 in which kinetic energy is generated from expansion of a working fluid. The fluid expansion system can be part of a closed system, such as a Rankine Cycle or the like, in which a pressurized and heated working fluid is permitted to expand and release energy in the turbine generator apparatus 100. For example, the heated and pressurized working fluid may enter the turbine generator apparatus 100 through an inlet conduit 105 and thereafter expand as the fluid flows over a rotatable turbine wheel 120. In this embodiment, the working fluid is then directed to an outlet side 125 (refer to FIG. 3) of the turbine wheel 120 so as to flow axially through a body casing 107 and toward an outlet conduit 109.

The turbine wheel 120 can be configured to rotate as the working fluid expands and flows toward the outlet side 125 of the turbine wheel 120. In this embodiment, the turbine wheel 120 is a shrouded turbine wheel that includes a number of turbine blades 122 that translate the force from fluid acting against the blades 122 into the rotational motion of the turbine wheel 120. In other embodiments, the shroud can be omitted and/or different configurations of turbine wheels can be used. The working fluid can flow through the turbine wheel inlet 124 located proximate to an input side 126 (refer to FIG. 3) of the turbine wheel 120, act upon the turbine blades 122, and exit to the outlet side 125 of the turbine wheel. For example, in this embodiment, the outlet side 125 of the turbine wheel 120 includes the region extending from proximate the outlet face of the turbine wheel 120 and toward the outlet conduit 109. In some embodiments, the turbine wheel 120 is shaft mounted and coupled to a rotor 140. The rotor 140 may include a magnet 150. As such, the turbine wheel 120 is driven to rotate by the expansion of the working fluid in the turbine generator apparatus 100, and the rotor 140 (including the magnet 150) rotate in response to the rotation of the turbine wheel 120. In certain embodiments, the turbine wheel 120 is directly coupled to the rotor 140, for example, by fasteners, rigid drive shaft, welding, or other manner. In certain embodiments, the turbine wheel 120 can be indirectly coupled to the rotor 140, for example, by a gear train, cutch mechanism, or other manner.

As shown in FIGS. 1-2, two bearing supports 115 and 145 are arranged to rotatably support the turbine wheel 120 relative to the body casing 107. In certain embodiments, one or more of the bearing supports 115 or 145 can include ball bearings, needle bearings, magnetic bearings, journal bearings, or other. For example, in this embodiment, the first and second bearing supports 115 and 145 comprise magnetic bearings having operability similar to those described in U.S. Pat. No. 6,727,617 assigned to Calnetix Inc. The disclosure of U.S. Pat. No. 6,727,617 describing the features and operation of magnetic bearing supports is incorporated by reference herein. The first bearing support 115 is mounted to a frame structure 116 on the input side 126 of the turbine wheel 120, and the second bearing support 145 is mounted to a second frame structure 146 on the outlet side 125 of the turbine wheel 120. In such circumstances, the turbine wheel 120 and the rotor 140 may be axially aligned and coupled to one another so as to collectively rotate about the axis of the bearing supports 115 and 145. Accordingly, both the turbine wheel 120 and the rotor 140 can be supported in a non-cantilevered manner by the first and second bearing supports 115 and 145.

In the embodiments in which the first and second bearing supports 115 and 145 comprise magnetic bearings, the turbine generator apparatus 100 may include one or more backup bearing supports. For example, the first and second bearing supports 115 and 145 may comprise magnetic bearings that operate with electrical power. In the event of a power outage that affects the operation of the magnetic bearing supports 115 and 145, first and second backup bearings 119 and 149 may be employed to rotatably support the turbine wheel 120 during that period of time. The first and second backup bearing supports 119 and 149 may comprise ball bearings, needle bearings, journal bearings, or the like. In this embodiment, the first backup bearing support 119 includes ball bearings that are arranged near the first magnetic bearing support 115. Also, the second backup bearing support 149 includes ball bearings that are arranged near the second magnetic bearing support 145. Thus, in this embodiment, even if the first and second bearing supports 115 and 149 temporarily fail (e.g., due to an electric power outage or other reason), the first and second backup bearing supports 119 and 149 would continue to support both the turbine wheel 120 and the rotor 140 in a non-cantilevered manner.

Still referring to FIGS. 1-2, some embodiments of the turbine generator apparatus 100 may be configured to generate electricity in response to the rotation of the driven member 150. For example, as previously described, the magnet 150 may comprise a permanent magnet that rotates within an electric generator device 160. The electric generator device 160 may include a stator 162 in which electrical current is generated by the rotation of the magnet 150 therein. For example, the stator 162 may include a plurality of a conductive coils used in the generation of electrical current. The stator 162 and other components of the electric generator device 160 may produce heat as a byproduct during the generation of electrical current. As described in more detail below, at least some of the heat byproduct can be dissipated by flow of the working fluid exiting to the outlet side 125 of the turbine wheel 120. The electrical power generated by the rotation of the magnet 150 within the stator 162 can be transmitted to a generator electronics package arranged outside of the body casing 107. In some embodiments, the electrical power from the stator 162 can be directed to one or more electrical connectors 167 for transmission to the electronics package, which then configures the electrical power to selected settings. The power output can be configured to provide useable electrical power, including either AC or DC power output at a variety of voltages. For example, the generator electronics package may be used to output a 3-phase 60 Hz power output at a voltage of about 400 VAC to about 480 VAC, preferably about 460 VAC. In a second example, the generator electronics package may be used to output a DC voltage of about 12 V to about 270 V, including selected outputs of 12 V, 125 V, 250 V, and 270 V. In alternative embodiments, the electrical power output may be selected at other settings, including other phases, frequencies, and voltages. Furthermore, the turbine generator apparatus 100 can be used to generate power in a "stand alone" system in which the electrical power is generated for use in an isolated network (e.g., to power an isolated machine or facility) or in a "grid tie" system in which the power output is linked or synchronized with a power grid network (e.g., to transfer the generated electrical power to the power grid).

The turbine generator apparatus 100 may include a number of longitudinally extending fins 170. The fins 170 may support the stator 162 in relation to the rotor 140 and direct the working fluid axially through the body casing 107. For example, the working fluid can exit to the outlet side 125 of the turbine wheel 120 and be directed by a contoured surface 142 of the rotor 140 toward the longitudinal fins 170. In some circumstances, the longitudinal fins 170 may serve as cooling fins that shunt at least a portion of the heat byproduct from the stator 162 to the longitudinal fins 170 for subsequent heat dissipation by the fluid flow. As the working fluid flows along the longitudinal fins 170, the working fluid passes along components of the electrical generator device 160 so as to dissipate heat therefrom. In this embodiment, the working fluid is directed to flow over the stator 162, as well as, between the stator 162 and rotor 140. The electrical generator device 160 may include a number of electronic components (including the stator 162) that produce significant heat during operation, so dissipation of such heat can reduce the likelihood of component failure. As shown in FIGS. 1-2, because the permanent magnet 150 and the electrical generator device 160 are arranged on the outlet side 125 of the turbine wheel 120, the working fluid that exits the turbine wheel 120 can be used to cool the components of the electrical generator device 160, thereby reducing the need for an external cooling system for the electrical generator device 160.

Figure 3:
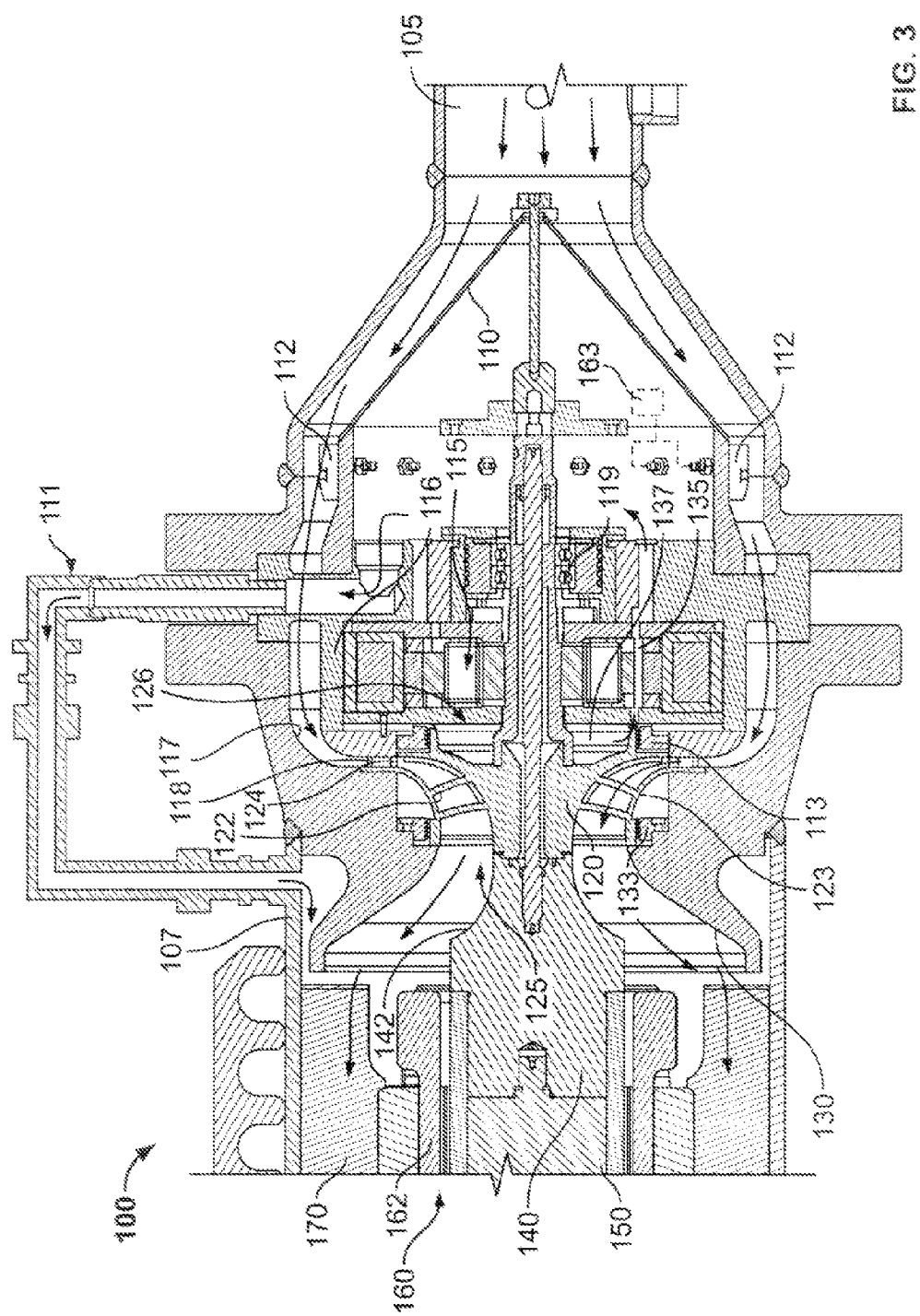
FIG. 3 is a cross-section view of a portion of the turbine generator system of FIG.

Referring now to the turbine generator apparatus 100 in more detail as shown in FIG. 3, the inlet conduit 105 can be a tubular structure that receives the heated and pressurized working fluid and directs the working fluid toward the input side 126 of the turbine wheel 120. The inlet conduit 105 can be mounted to the body casing 107 using a number fasteners that extend through adjacent flange portions. As such, the inlet conduit 105 can be removed from the body casing 107 so as to access the components on the input side 126 of the turbine wheel 120. For example, the inlet conduit 105 can be removed to provide service access to components such as a flow diverter cone 110, the first bearing support 115, and the first backup bearing support 119 that are disposed on the input side 126 of the turbine wheel 120. As described below, such access can be achieved without necessarily removing the turbine wheel 120 from the turbine apparatus 100.

The flow diverter cone 110 is arranged to extend into a portion of the inlet conduit 105 so as to direct the working fluid toward the turbine wheel inlet 124 disposed near the input side 126 of the turbine wheel 120. The flow diverter cone 110 may include a number of pre-swirl vanes 112 that impose a circumferential flow component to the inlet fluid flow. As such, when the working fluid flows into the turbine wheel inlet 124, the flow may have a circumferential swirl component that is at least partially similar to the rotational direction of the turbine wheel 120. In some embodiments, the pre-swirl vanes 112 may be fixedly mounted to the flow diverter cone 110 at a predetermined angle so as to provide the desired tangential flow component. Alternatively, the pre-swirl vanes 112 can be adjustably mounted to the flow diverter cone 110 so that the angle of the vanes 112 can be adjusted (e.g., by movement of an actuator 163, such as a hydraulic or electrical actuator coupled to the vanes 112) to vary the pre-swirl angle of all vanes 112 in unison according to varying fluid flow conditions. In certain embodiments, the flow diverter cone 110 can house elements of the system, for example, one or more actuators 163 and other components. Although the pre-swirl vanes 112 are depicted as being mounted to the diverter cone 110 in this embodiment, the pre-swirl vanes 112 can be fixedly mounted or adjustably mounted to the inlet conduit 105 near an inducer channel 117 to provide the desired tangential flow of the working fluid.

Still referring to FIG. 3, the working fluid flows from the pre-swirl vanes 112 and into the inducer channel 117 that directs the working fluid toward the turbine wheel inlet 124. In this embodiment, the turbine wheel inlet 124 is a radial inflow inlet disposed near the input side 126 of the turbine wheel 120. As such, the inducer channel 117 may direct the working fluid to flow radially toward the turbine wheel inlet 124 (with the tangential flow component imposed by the pre-swirl vanes 112). The working fluid may pass through an inlet nozzle device 118 that borders the periphery of the turbine wheel inlet 124. The inlet nozzle device 118 may have adjustable inlet nozzle geometry in which the inlet nozzle can be adjusted by one or more actuators. As previously described, the flow diverter cone 110 can be accessed for service or maintenance by removing the inlet conduit 105 (without necessarily removing the turbine wheel 120). Similarly, the inlet nozzle device 118 can be accessed for service or maintenance by removing the inlet conduit 105 and the first frame structure 116 (again, without necessarily removing the turbine wheel 120).

When the working fluid flows into the turbine wheel inlet 124, the working fluid acts upon the turbine blades 122 so as to impose a rotational force upon the turbine wheel 120. In particular, the turbine wheel 120 that rotates about the wheel axis as the working fluid expands and flows toward the outlet side 125 of the turbine wheel 120. For example, in some embodiments that employ an engineered fluid for use in an organic Rankine cycle, the working fluid may be pressurized and heated (in this example, to a temperature of about 230° F.) as it enters the inlet conduit 105 and thereafter may expand as it flows over the turbine wheel 120 and exits to the outlet side 125 (in this example, at a temperature of about 120° F.). In alternative embodiments, the temperatures of the working fluid in the pressurized and heated state and the expanded state may be different from the previous example. In particular, the working fluid temperatures in the pressurized and heated state and in the expanded state may be selected based on a number of factors, such as the specific application in which the turbine generator apparatus 100 is used, the properties of the working fluid, and the like. At least a portion of the energy released from the expansion of the working fluid can be converted into kinetic energy in the form of rotation of the turbine wheel 120. As previously described, in this embodiment, the turbine wheel 120 is a shrouded turbine wheel that includes a number of turbine blades 122 that translate the force from the working fluid acting against the blades 122 into the rotational motion of the turbine wheel 120. The turbine blades 122 can extended from the contoured hub of the turbine wheel 120 to the wheel shroud 123 and may be angled or contoured so as to impose a rotational force on the turbine wheel 120 as the working fluid acts against the blades 122.

Still referring to FIG. 3, the working fluid can flow through the turbine wheel inlet 124 located proximate to the input side 126 of the turbine wheel, act upon the turbine blades 122, and exit to the outlet side 125 of the turbine wheel 120 (e.g., the region extending from proximate the outlet face of the turbine wheel 120 and toward the outlet conduit 109). The turbine wheel 120 can be arranged in the turbine generator apparatus 100 so that the driven member 150 is on the outlet side 125 of the turbine wheel 120 (rather than on the input side 126 of the turbine wheel 120). In such embodiments, the outlet flow of working fluid to the outlet side 125 of the turbine wheel 120 is directed toward the rotor 140 and the driven member 150. Such an arrangement of the turbine wheel 120 and the driven member 150 may provide a number of features that are useful in the construction, operation, and maintenance of the turbine generator apparatus 100.

For example, in some embodiments, the arrangement of the turbine wheel 120 permits the turbine wheel 120 to be supported by bearing supports both the input side 126 and the outlet side 125 (e.g., including the region extending toward the outlet conduit 109). As previously described, the turbine wheel 120 can be rotationally supported by the first bearing support 115 (FIG. 3 and FIG. 2) and the second bearing support 145 (FIG. 2). The first bearing support 115 is arranged on the input side 126 of the turbine wheel 120 so as to support the turbine wheel 120 relative to the first frame structure 116 and the body casing 107 of the turbine generator apparatus 100. As such, the turbine wheel 120 can rotate about the axis of the first bearing support 115. In this embodiment, the turbine wheel 120 is not necessarily overhung from the first bearing support 115 in a cantilever fashion (e.g., with no bearing support on the one of the turbine wheel). Rather, in this embodiment, the second bearing support 145 (FIG. 2) is arranged on the outlet side 125 of the turbine wheel 120 (here, residing at an end of the rotor 140 opposite the turbine wheel 120 and within the region extending toward the outlet conduit 109) so as to support the turbine wheel 120 relative to the second frame structure 146 and the body casing 107 of the turbine generator apparatus 100. Accordingly, the turbine wheel 120 can be rotatably mounted between the first bearing support 115 on the input side 126 and the second bearing support 145 on the outlet side 125 of the turbine wheel 120. In such circumstances, the turbine wheel 120 (and the rotor 140 in this embodiment) can be supported in a non-cantilevered fashion.

Such a configuration of the bearing supports 115 and 145 on both the input side 126 and the outlet side 125 of the turbine wheel can provide an environment that is favorable to rotordynamic operation and lubrication. For example, employing bearing supports on opposing sides of the turbine wheel 120 may provide more uniform lubrication and load distribution along the rotational interfaces of the bearing supports (as compared to an overhung turbine wheel that is cantilevered from a bearing support). In addition, such a configuration can improve temperature control of the rotational interfaces. Further, the arrangement of the turbine wheel 120 in the turbine generator apparatus 100 can reduce the time and disassembly operations normally required for inspection and service of the bearing supports. For example, the bearing supports 115 and 145 can be accessed for inspection and servicing without necessarily removing the turbine wheel 120 from the turbine apparatus 100. As shown in FIG. 3, the first bearing support 115 (and, in this embodiment, the first backup bearing support 119) can be readily accessed by removing the inlet conduit 105 and the flow diverter cone 110 while the turbine wheel 120 remains generally in place. Because the inlet conduit 105 and flow diverter cone 110 can be comparatively smaller and lighter weight than conventional cast scrolls, it is easier to access the turbine wheel 120 and first bearing supports 115. As shown in FIG. 2, the second bearing support 145 can be readily accessed by removing the outlet conduit 109 and a cap portion of the second frame structure 146 (again, while the turbine wheel 120 remains generally in place).

Still referring to FIG. 3, the arrangement of the turbine wheel 120 in the turbine generator apparatus 100 permits the fluid outflow to the outlet side 125 of the turbine wheel to be directed toward the stator 162, rotor 140, and/or other components. As such, the working fluid can be used as a heat dissipation flow after it has expanded (and thereby cooled). For example, the working fluid can dissipate heat from the electrical generator device 160, including the stator 162 and other components.

As shown in FIG. 3, the working fluid exits the turbine wheel 120 into an exhaust conduit 130, which includes a contoured surface to guide the expanded working fluid. The fluid flow that exits to the outlet side 125 of the turbine wheel 120 may be directed in a generally axial direction toward the rotor 140 and stator 162, which are arranged along the outlet side 125 of the turbine wheel 120. In some embodiments in which the stator 162 is to be cooled, at least a portion of the flow of the working fluid may continue in the generally axial direction so as to flow directly over the stator 162 (e.g., along the outside of the stator 162 and along the longitudinal fins 170). In some embodiments in which the rotor 140 is to be cooled, at least a portion of the flow of the working fluid may continue in the generally axial direction so as to flow between the rotor 140 and the stator 162. Accordingly, some or all of the working fluid can be directed to flow over and dissipate heat from components of the electrical generator device 160. The rotor 140 may include a contoured surface 142 that redirects some or all of the fluid flow at least partially in a radial direction toward the longitudinal fins 170, which then guide the working fluid at least partially in an axial direction. Thus, some or all of the working fluid can be directed by the contoured surface 142 and the exhaust conduit 130 so as to flow over particular components of the electrical generator device 160.

Such an arrangement of the driven member 150 on the outlet side 125 of the turbine wheel 120 facilitates the use of the expanded working fluid as a heat dissipation medium. In some circumstances, the heat dissipation flow provided by the expanded working fluid may reduce or eliminate the need for an external cooling system for the rotor 140 and/or stator 162 (and other components of the electrical generator device 160). For example, the expanded working fluid may flow along the longitudinal fins 170 at a rate so as to cool the stator 162 without employing an external cooling system to remove heat from the stator 162.

Still referring to FIG. 3, the arrangement of the turbine wheel 120 in the turbine generator apparatus 100 provides for the use of seals 113 and 133, which can serve to inhibit leakage of the working fluid out of the flow path. In addition, the arrangement of the turbine wheel 120 permits the seals 113 and 133 to be readily accessed for inspection and service. As shown in FIG. 3, the first seal 113 can be disposed on the input side 126 along an outer annular surface of the turbine wheel 120. The first seal 113 can inhibit leakage of working fluid passing from the nozzle device 118 to a reaction pressure reservoir 137, and such leakage reduction can be used to direct the working fluid to the wheel inlet 124. The second seal 133 can be disposed near the outlet side 125 of the turbine wheel along an outer annular surface of the wheel shroud 123. The second seal 133 can inhibit leakage of working fluid passing from the nozzle device 118 to the exhaust conduit 130, and such leakage reduction can be used to reduce the likelihood of the working fluid bypassing the wheel inlet 124. One or both of the first and second seals 113 and 133 can be continuous-ring seals that are unitary and circumscribe the turbine wheel 120. One or both may additionally, or alternatively, be labyrinth seals and may comprise a polymer material. In this embodiment, the first and second seals 113 and 133 have identical configurations.

In certain embodiments, the turbine wheel 120 can be pressure balanced. For example, when the working fluid exits to the outlet side 125 of the turbine wheel 120, a low pressure region may be created near the turbine wheel outlet, which creates a thrust force is in the axial direction toward the outlet side 125. To counter this low pressure region and the resulting thrust force, the reaction pressure reservoir 137 is arranged on the input side 126 of the turbine wheel 120. The reaction pressure reservoir 137 may be in fluid communication with the exhaust conduit 130 so as to substantially equalize the pressure regions on both sides of the turbine wheel 120, thereby providing a thrust balance arrangement for the turbine wheel 120.

For example, as the turbine wheel 120 operates, a small amount of working fluid may seep into the reaction pressure reservoir 137 (e.g., some fluid may seep along the dynamic seal surface of the first seal 113). As shown in FIG. 3, in response to lower pressure near the turbine wheel outlet, the pressure in the reservoir 137 may be reduced by directing the working fluid in the reaction pressure reservoir 137 into a first channel 135 to a region on the interior of the flow diverter cone 110. This region is in fluid communication with a second conduit 111 (e.g., shown as an external piping arrangement) that extends toward the exhaust conduit 130. Accordingly, the fluid pressure in the reaction pressure reservoir 137 may be equalized with the fluid pressure near the turbine wheel outlet in the exhaust conduit 130, thereby neutralizing the thrust force that may other occur if the pressure on near the turbine wheel outlet was substantially different from the pressure in the reservoir 137. Such a balancing of the thrust load imposed upon the turbine wheel 120 may permit a substantial increase the permissible pressure drop across the turbine wheel 120, which can thereby increase the maximum kinetic energy generated by the rotation of the turbine wheel 120.

It should be understood that, in other embodiments, the reaction pressure reservoir 137 may be in fluid communication with the exhaust conduit 130 via internal channels through the first frame member 116 and the exhaust conduit (rather than using the external piping of the second conduit 111). For example, the first channel 135 may be in fluid communication with a second channel bored partially through the first frame structure 116 and partially through the wall of the exhaust conduit 130. In such circumstances, the reaction pressure reservoir 137 can be in fluid communication with the exhaust conduit 130 so as to substantially equalize the pressure regions on both sides of the turbine wheel 120.

Still referring to FIG. 3, the arrangement of the turbine wheel 120 in the turbine generator apparatus 100 can reduce the likelihood of leakage to or from the external environment. For example, because the flow from the outlet of the turbine wheel 120 is maintained within the turbine generator apparatus 100 rather than being exhausted outside of the system, the housing of the turbine generator apparatus 100 (including body casing 107) can be more readily hermetically sealed from the inlet conduit 105 to the outlet conduit 109. Moreover, seepage of working fluid to the input side 126 of the turbine wheel 120 can simply reenter the working fluid flow path rather than leaking into the environment. For example, in the embodiment depicted in FIG. 3, the working fluid flows through the inlet nozzle 118 to the turbine wheel 120. As such, any leakage of the working fluid toward the input side 126 of the turbine wheel 120 would merely migrate into the reservoir 137. The fluid that seeps into the reservoir 137 can readily reenter into the working fluid flow path via the first and second conduits 135 and 111 (returning to the flow path near the exhaust conduit 130). In such circumstances, the working fluid that was leaked to the input side 126 of the turbine wheel 120 can reenter the flow of the working fluid without seeping into the external environment (e.g., outside the inlet conduit 105, the body casing 107, or flow path piping).

Thus, such an arrangement of the turbine wheel 120 can provide a hermetically sealed turbine generator apparatus 100. Some embodiments of the hermetically sealed turbine generator apparatus 100 may be useful, for example, when the working fluid is a regulated or hazardous fluid that should not be released into the external environment. In some circumstances, the regulated or hazardous fluids may include engineered fluids that are used in a number of organic Rankine cycles. For example, certain embodiments may use GENETRON 245fa, a product of Honeywell International, Inc., as a working fluid. In alternative embodiments, the working fluid may comprise other engineered materials. Accordingly, the turbine generator apparatus 100 can be employed in an organic Rankine cycle so as to reduce the likelihood of leaking the working fluid into the surrounding environment.

Figure 4:
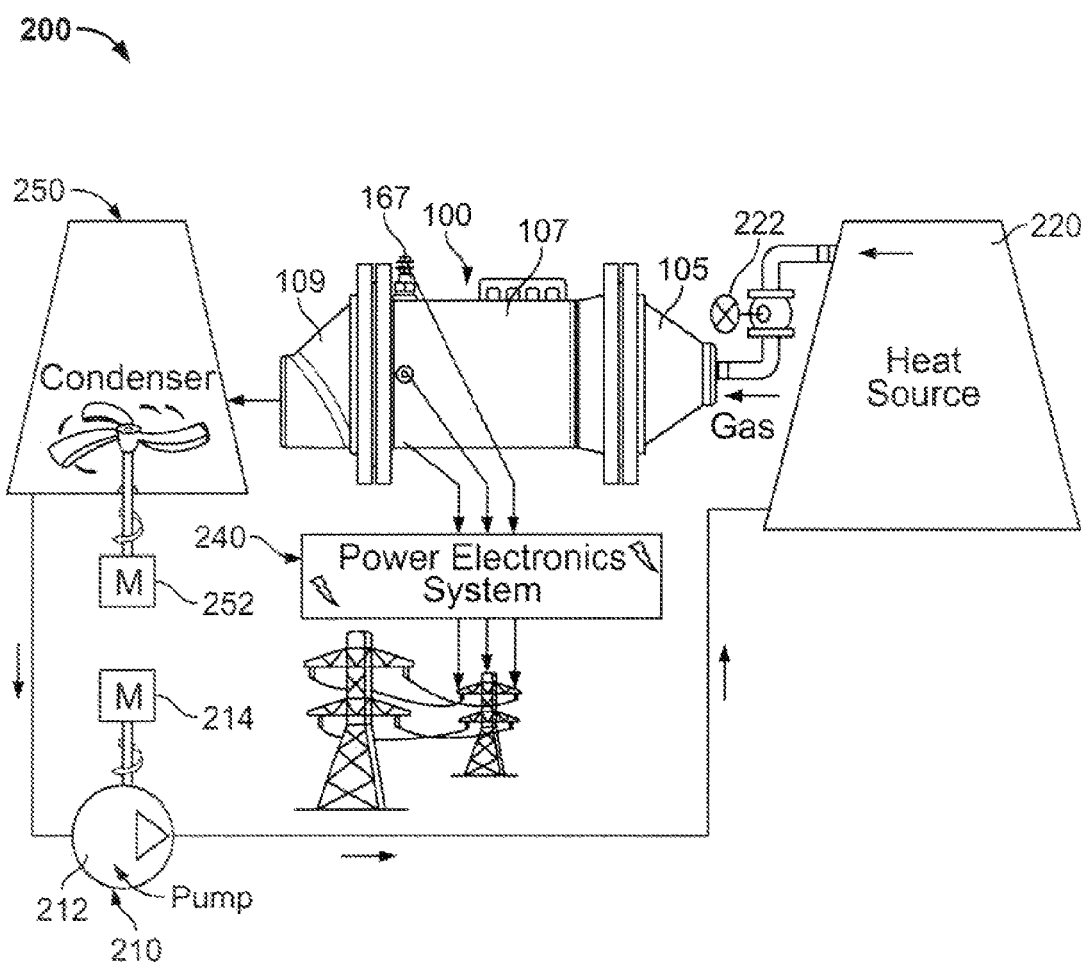
FIG. 4 is a diagram of a turbine generator system used in a fluid expansion system to generate electrical power, in accordance with some embodiments.

Referring now to FIG. 4, some embodiments of the turbine generator apparatus 100 can be used in a Rankine cycle 200. The Rankine cycle 200 may comprise an organic Rankine cycle that employs an engineered working fluid. The working fluid in such a Rankine cycle may comprise a high molecular mass organic fluid that is selected to efficiently receive heat from relatively low temperature heat sources. In particular circumstances, the turbine generator apparatus 100 can be used to convert heat energy from a heat source into kinetic energy (e.g., rotation of the rotor 140), which is then converted into electrical energy. For example, the turbine generator apparatus 100 may output electrical power that is configured by an electronics package to be in form of 3-phase 60 Hz power at a voltage of about 400 VAC to about 480 VAC. As previously described, alternative embodiments may out electrical power having other selected settings. In some embodiments, the turbine generator apparatus 100 may be configured to provide an electrical power output of about 2 MW or less, about 50 kW to about 1 MW, and about 100 kW to about 300 kW, depending upon the heat source in the cycle and other such factors. Again, alternative embodiments may provide electrical power at other Wattage outputs. Such electrical power can be transferred to a power electronics system and, in some embodiments, to an electrical power grid system. Alternatively, the electrical power output by the turbine generator apparatus 100 can be supplied directly to an electrically powered facility or machine.

The Rankine cycle 200 may include a pump device 210 that pressurizes the working fluid. In some embodiments, the pump device 210 may be coupled to a reservoir 212 that contains the working fluid, and a pump motor 214 can be used to pressurize the working fluid. The pump device 210 may be used to convey the working fluid to a heat source 220 of the Rankine cycle 200. The heat source 220 may include heat that is recovered from an existing process (e.g., an industrial process in which heat is byproduct). In such circumstances, the working fluid may be directly heated by the existing process or may be heated in a heat exchanger in which the working fluid receives heat from a byproduct fluid of the existing process. In this embodiment, the working fluid can cycle through the heat source 220 so that a substantial portion of the fluid is converted into gaseous state. Accordingly, the working fluid is pressurized by the pump device 210 and then heated by the heat source 220.

Still referring to FIG. 4, the pressurized and heated working fluid may pass from the heat source 220 to the turbine generator apparatus 100. In some embodiments, one or more valves 22 may be used to control the flow of the working fluid to the turbine generator apparatus 100. As previously described in connection with FIGS. 1-3, the heated and pressurized working fluid may pass through the inlet conduit 105 and toward the turbine wheel 120 (FIG. 3). The working fluid expands as it flows across the turbine wheel 120 and into the body casing 107, thereby acting upon the turbine wheel 120 and causing rotation of the turbine wheel 120. Accordingly, the turbine generator apparatus 100 can be included in a fluid expansion system in which kinetic energy is generated from expansion of the working fluid.

The rotation of the turbine wheel 120 is translated to the rotor 140, which in this embodiment includes the magnet 150 that rotates within an electrical generator device 160 (FIGS. 1-3). As such, the kinetic energy of the turbine wheel 120 is used to generate electrical energy. As previously described, the electrical energy output from the electrical generator device 160 can be transmitted via one or more connectors 167 (e.g., three connectors 167 are employed in this embodiment). In some embodiments, the electrical energy can be communicated via the connectors 167 to a power electronics system 240 that is capable of modifying and storing the electrical energy. In one example, the power electronics system 240 may be similar to power substation that is connected to an electrical power grid system. As previously described, in some embodiments, the turbine generator apparatus 100 may be configured to provide an electrical power output of about 2 MW or less, about 50 kW to about 1 MW, and about 100 kW to about 300 kW, depending upon the heat source 220, the expansion capabilities of the working fluid, and other such factors. As an alternative to the embodiment depicted in FIG. 4, the electrical energy output by the turbine generator apparatus 100 can be supplied directly to an electrically powered facility or machine.

In some embodiments of the Rankine cycle 200, the working fluid may flow from the outlet conduit 109 of the turbine generator apparatus 100 to a condenser 250. The condenser 250 may include a motor 252 that is used to remove excess heat from the working fluid so that a substantial portion of the working fluid is converted to a liquid state. For example, the motor 252 may be used to force cooling airflow over the working fluid. In another example, the motor 252 may be used to force a cooling fluid to flow in a heat exchange process with the working fluid. After the working fluid exits the condenser 250, the fluid may return to the reservoir 212 where it is prepared to flow again though the cycle 200.

It should be understood from the description herein that, in some embodiments, the Rankine cycle 200 may comprises an organic Rankine cycle that employs an engineered working fluid. As previously described, the working fluid in such an organic Rankine cycle may comprise a high molecular mass organic fluid that is selected to efficiently receive heat from relatively low temperature heat sources.

Furthermore, in alternative embodiments, the turbine generator apparatus 100 may be used in other cycles or systems that involve expansion of a fluid. For example, other embodiments of the turbine generator apparatus 100 may be configured for use in a Carnot cycle, a gas letdown system, a cryogenic expander system, or a process expansion system. In each of these cycles of systems, the fluid may expand during a process that causes the turbine wheel 120 (FIG. 3) to rotate, thereby permitting the turbine generator apparatus 100 to generate electrical energy from the fluid expansion.

A number of embodiments of the invention have been described. Nevertheless, it will be understood that various modifications may be made without departing from the spirit and scope of the invention. Accordingly, other embodiments are within the scope of the following claims.

What is claimed is:

1. An apparatus comprising:
   a turbine wheel rotatable in response to expansion of a working fluid flowing from proximate an inlet side to an outlet side of the turbine wheel, the turbine wheel configured to receive the working fluid flowing radially into the inlet side of the turbine wheel and output the working fluid flowing axially from the outlet side of the turbine wheel;
   a generator having a stator and a rotor, the rotor coupled to the turbine wheel so as to rotate when the turbine wheel rotates, the generator adjacent the outlet side of the turbine wheel; and
   a conduit to direct the working fluid exiting to the outlet side of the turbine wheel to cool at least one of the rotor or the stator.

2. The apparatus of claim 1, wherein the rotor resides on the outlet side of the turbine wheel.

3. The apparatus of claim 1, wherein the turbine wheel is directly coupled to the rotor.

4. The apparatus of claim 1, further comprising first and second bearings supporting the turbine wheel, the first bearing residing on the outlet side of the turbine wheel and the second bearing residing on the inlet side of the turbine wheel opposite the outlet side.

5. The apparatus of claim 4, wherein the first and second bearings comprise magnetic bearings.

6. The apparatus of claim 4, wherein the first bearing resides proximate an end of the rotor opposite the turbine wheel.

7. The apparatus of claim 1, further comprising a flow diverter member disposed on the inlet side of the turbine wheel, the flow diverter member comprising a surface adapted to direct the working fluid radially outward toward an inlet of the turbine wheel.

8. The apparatus of claim 7, further comprising one or more vanes to direct the working fluid toward a circumferential flow direction before entering the inlet of the turbine wheel.

9. The apparatus of claim 8, wherein the one or more vanes are carried by at least one of the flow diverter member or an inlet conduit.

10. The apparatus of claim 8, further comprising an actuator coupled to one or more of the vanes to adjust the orientation of the one or more vanes, the actuator residing at least partially within the flow diverter.

11. The apparatus of claim 1, further comprising:
    a housing about the turbine wheel; and
    a seal on the inlet side of the turbine wheel adapted to substantially seal between the turbine wheel and the housing, at least a portion of the seal being unitary and circumscribing the turbine wheel.

12. The apparatus of claim 11, further comprising a second seal on the outlet side of the turbine wheel adapted to substantially seal between the turbine wheel and the housing, at least a portion of the second seal being unitary and circumscribing the turbine wheel.

13. The apparatus of claim 12, wherein the second seal has a substantially identical configuration as the first seal.

14. The apparatus of claim 1, wherein the rotor comprises a contoured surface adapted to direct at least a portion of the working fluid exiting to the outlet side of the turbine wheel around the rotor.

15. The apparatus of claim 1, further comprising a housing having an inlet conduit about one end and an outlet conduit about an opposite end, the housing enclosing the turbine wheel, the rotor and the stator and being hermetically sealed between the inlet and outlet conduits.

16. The apparatus of claim 1, wherein the turbine wheel is pressure balanced during expansion of the working fluid.

17. The apparatus of claim 1, wherein the turbine generator apparatus is incorporated into one of a Rankine cycle, a Carnot cycle, a gas letdown system, a cryogenic expander system, and a process expansion system.

18. A turbine generator apparatus, comprising:
- a turbine wheel that is rotatable in response to expansion of a working fluid flowing from proximate an inlet side to an outlet side of the turbine wheel, the turbine wheel configured to receive the working fluid flowing radially into the inlet side of the turbine wheel and output the working fluid flowing axially from the outlet side of the turbine wheel;
- a permanent magnet device coupled to the turbine wheel so as to rotate when the turbine wheel rotates, wherein the permanent magnet device is arranged on the outlet side of the turbine wheel;
- an electric generator device in which the permanent magnet is rotatable, the electric generator device creating heat when the permanent magnet rotates, wherein at least a portion of the working fluid exiting to the outlet side of the turbine wheel is directed toward the electric generator device to dissipate heat from the electric generator device; and
- first and second bearing supports coupled to the turbine wheel, the first bearing support being arranged on the outlet side of the turbine wheel and the second bearing support being arranged on an input side of the turbine wheel opposite the outlet side, wherein the turbine wheel is supported in a non-cantilever manner between the first and second bearing supports.

19. A method comprising:
- receiving a fluid into a radial inlet of a turbine wheel;
- rotating a rotor of a generator using a turbine wheel;
- outputting the fluid from an axial outlet of the turbine wheel, where the axial outlet of the turbine wheel is oriented towards and adjacent the generator; and
- cooling at least one of the rotor or a stator of the generator with a flow of fluid exiting the axial outlet of the turbine wheel.

20. The method of claim 19, wherein the flow of fluid exiting the turbine wheel initially exits axially from the turbine wheel.

21. The method of claim 19, wherein cooling at least one of the rotor or the stator comprises directing the flow of fluid over at least one of the rotor or the stator.

* * * * *